US012030188B2

(12) United States Patent
Kanno

(10) Patent No.: US 12,030,188 B2
(45) Date of Patent: Jul. 9, 2024

(54) COLLABORATIVE ROBOT SYSTEM

(71) Applicant: FANUC CORPORATION, Yamanashi (JP)

(72) Inventor: Ichiro Kanno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 730 days.

(21) Appl. No.: 16/844,529

(22) Filed: Apr. 9, 2020

(65) Prior Publication Data

US 2020/0376664 A1 Dec. 3, 2020

(30) Foreign Application Priority Data

May 31, 2019 (JP) ................................ 2019-102181

(51) Int. Cl.
*B25J 9/16* (2006.01)
*B25J 11/00* (2006.01)

(52) U.S. Cl.
CPC .......... *B25J 9/1666* (2013.01); *B25J 11/005* (2013.01)

(58) Field of Classification Search
CPC . B25J 9/16; B25J 9/1628; B25J 9/1664; B25J 9/1656; B25J 9/1666; B25J 9/1679;
(Continued)

(56) References Cited

U.S. PATENT DOCUMENTS

2016/0089790 A1 3/2016 Wang et al.
2016/0260027 A1* 9/2016 Kuwabara ............... F16P 3/142
(Continued)

FOREIGN PATENT DOCUMENTS

CN 101970185 A 2/2011
CN 108693851 A 10/2018
(Continued)

OTHER PUBLICATIONS

"Pearce, Optimizing Makespan and Ergonomics in Integrating Collaborative Robots Into Manufacturing Processes, IEEE, Oct. 2018" (Year: 2018).*
(Continued)

*Primary Examiner* — Khoi H Tran
*Assistant Examiner* — Sarah A Tran
(74) *Attorney, Agent, or Firm* — KARCESKI IP LAW, PLLC

(57) ABSTRACT

The present invention provides a collaborative robot system in which a robot and a worker share tasks and perform the tasks. The collaborative robot system including: a work-time-measurement-unit that measures work time for locations assigned to the worker and the robot; a difference-at-increase/decrease-prediction-unit that predicts a difference between the work time of the worker and the robot, when the number of locations assigned to the worker is increased or decreased; an assigned-location-adjustment-unit that increases or decreases the number of locations so that the difference in the work time becomes smaller, in a case in which a predicted-difference-value based on the work time of the worker and the robot, when the number of locations assigned to the worker is maintained is greater than the predicted-difference-value; and an assigned-location-indication-unit that indicates the locations assigned to the worker after the number of assigned locations is increased or decreased.

10 Claims, 7 Drawing Sheets

(58) Field of Classification Search
CPC . B25J 9/163; B25J 9/1687; B25J 11/00; B25J 11/005; G05B 2219/40; G05B 2219/40202; G05B 2219/40414; G05B 19/00; G05B 19/02; G05B 19/04; G05B 19/042; G05B 19/0426
USPC .......................................................... 700/253
See application file for complete search history.

(56) References Cited

U.S. PATENT DOCUMENTS

| | | | |
|---|---|---|---|
| 2017/0028553 | A1 | 2/2017 | Tsuda et al. |
| 2018/0099408 | A1* | 4/2018 | Shibata .................. B25J 9/1697 |
| 2018/0346256 | A1* | 12/2018 | Kurihara ................ B25J 9/1674 |
| 2019/0224844 | A1 | 7/2019 | Tsuda et al. |

FOREIGN PATENT DOCUMENTS

| | | | | |
|---|---|---|---|---|
| CN | 108942880 | A | | 12/2018 |
| JP | H10261122 | A | | 9/1998 |
| JP | H1119852 | A | | 1/1999 |
| JP | 2008168357 | A | | 7/2008 |
| JP | 2011227773 | A | * | 11/2011 |
| JP | 2011227773 | A | | 11/2011 |
| JP | 2014044619 | A | | 3/2014 |
| JP | 2017030137 | A | | 2/2017 |
| JP | 2018062016 | A | | 4/2018 |
| JP | 6330882 | B2 | | 5/2018 |
| JP | 2018169648 | A | | 11/2018 |
| JP | 2018205818 | A | | 12/2018 |
| JP | 6677461 | B2 | * | 4/2020 |
| WO | 2011021376 | A1 | | 2/2011 |

OTHER PUBLICATIONS

Japanese Decision to Grant dated Jan. 24, 2023, for Japanese Patent Application No. 2019-102181.
Chinese Notice of Patent Grant dated Jan. 11, 2024, for Chinese Patent Application No. 202010439257.2.

* cited by examiner

FIG. 5

NUMBER OF LOCATIONS ASSIGNED TO WORKER AFTER TRANSITION

| NUMBER OF LOCATIONS ASSIGNED TO WORKER BEFORE TRANSITION | $n-1$ | $n$ | $n+1$ |
|---|---|---|---|
| $n-1$ | +0.1 | +2.5 | |
| $n$ | -2.5 | +0.1 | +2.6 |
| $n+1$ | | -2.6 | +0.1 |

UNIT: SECOND

FIG. 6

NUMBER OF LOCATIONS ASSIGNED TO WORKER AFTER TRANSITION

| NUMBER OF LOCATIONS ASSIGNED TO WORKER BEFORE TRANSITION | $n-1$ | $n$ | $n+1$ |
|---|---|---|---|
| $n-1$ | 0.0 | -4.0 | |
| $n$ | +4.0 | 0.0 | -4.1 |
| $n+1$ | | +4.1 | 0.0 |

UNIT: SECOND

COLLABORATIVE ROBOT SYSTEM

CROSS-REFERENCE TO RELATED APPLICATIONS

This application is based on and claims priority to Japanese Patent Application No. 2019-102181, filed on May 31, 2019, the entire contents of which are incorporated herein by reference.

FIELD OF THE INVENTION

The present disclosure relates to a collaborative robot system.

BACKGROUND OF THE INVENTION

In a case in which a robot and a worker work by sharing tasks, there is a known robot system in which the robot performs some of the tasks that should be performed by the worker in place of the worker, when the work efficiency of the worker has decreased (for example, see Japanese Unexamined Patent Application, Publication No. 2011-227773). When the time required for the worker to perform certain tasks becomes longer than a prescribed time, the robot performs some of the tasks that should be performed by the worker in place of the worker, thereby suppressing a decrease in production efficiency.

SUMMARY OF THE INVENTION

An aspect of the present disclosure is a collaborative robot system in which a robot and a worker share tasks at a plurality of locations and repeatedly perform the tasks in a plurality of cycles, said collaborative robot system including: a work-time measurement unit that individually measures, in each cycle, work time for all locations assigned to the worker and work time for all locations assigned to the robot; a difference-at-increase/decrease prediction unit that predicts a difference between the work time of the worker and the work time of the robot, when the number of locations assigned to the worker is increased or decreased; an assigned-location adjustment unit that increases or decreases the number of locations assigned to the worker and the robot so that the difference in the work time becomes smaller, in a case in which a predicted difference value based on the work time of the worker and the work time of the robot, which have been measured by the work-time measurement unit, when the number of locations assigned to the worker is maintained is greater than the predicted difference value predicted by the difference-at-increase/decrease prediction unit; and an assigned-location indication unit that indicates, to the worker, the locations assigned to the worker after the number of assigned locations is increased or decreased by the assigned-location adjustment unit.

BRIEF DESCRIPTION OF THE DRAWINGS

FIG. 5 is a partially enlarged view of the work-time increase/decrease table in FIG. 4.
FIG. 6 is a partially enlarged view, similar to FIG. 5, of a work-time increase/decrease table for a robot.

DESCRIPTION OF EMBODIMENT(S) OF THE INVENTION

A collaborative robot system 1 according to an embodiment of the present disclosure will be described below with reference to the drawings.

Figure 1:
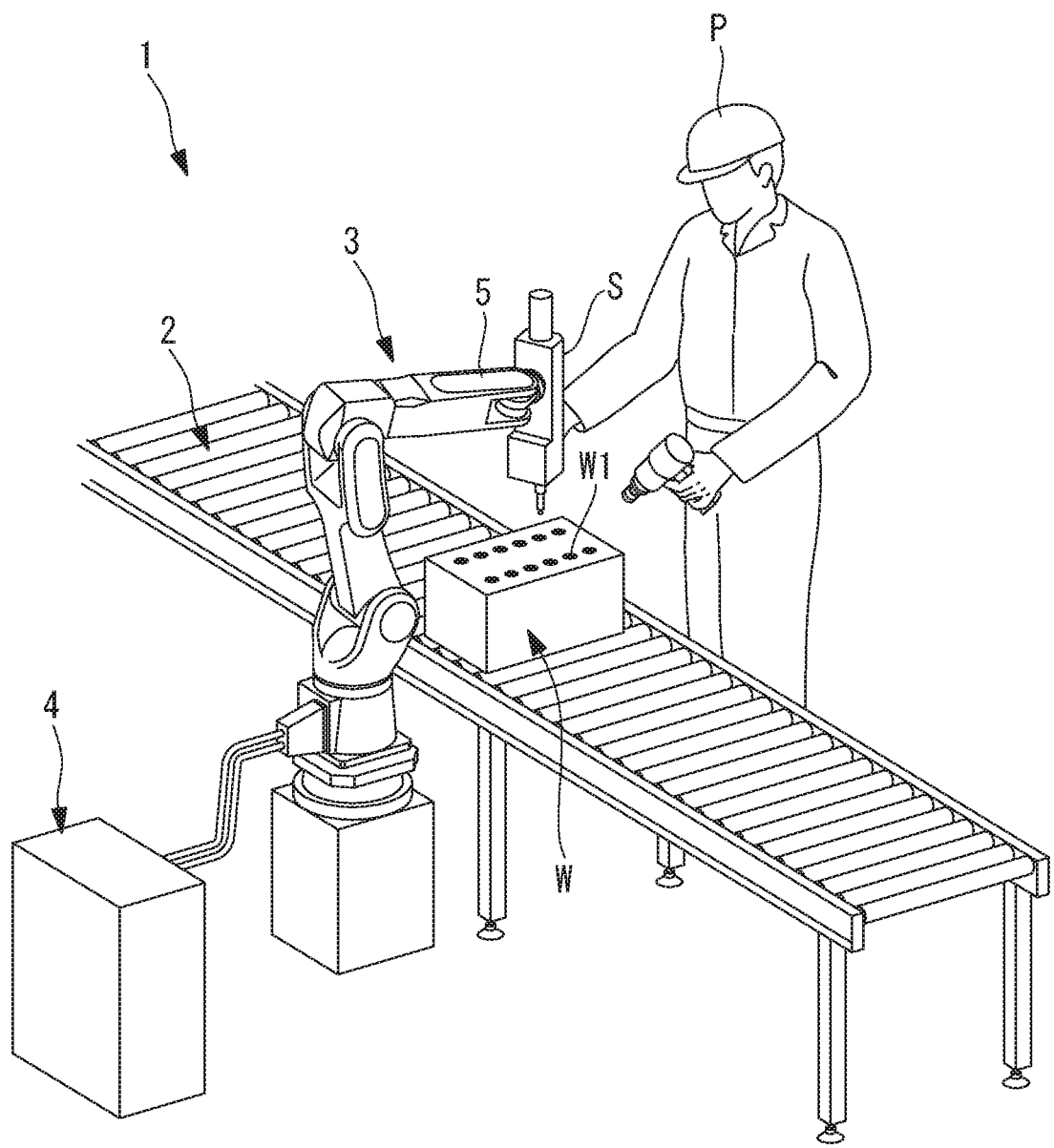
FIG. 1 is an overall configuration diagram showing a collaborative robot system according to an embodiment of the present disclosure.

As shown in FIG. 1, the collaborative robot system 1 according to this embodiment is, for example, a system in which a robot 3 and a worker P share the tasks of fastening bolts into screw holes W1 at a plurality of locations on a workpiece W conveyed by a conveyor 2.

The collaborative robot system 1 includes the robot 3 and a control device 4 that controls the robot 3. The robot 3 is, for example, a vertical six-axis articulated robot and is provided with a bolt-fastening tool S at the distal end of a wrist 5.

Figure 2:
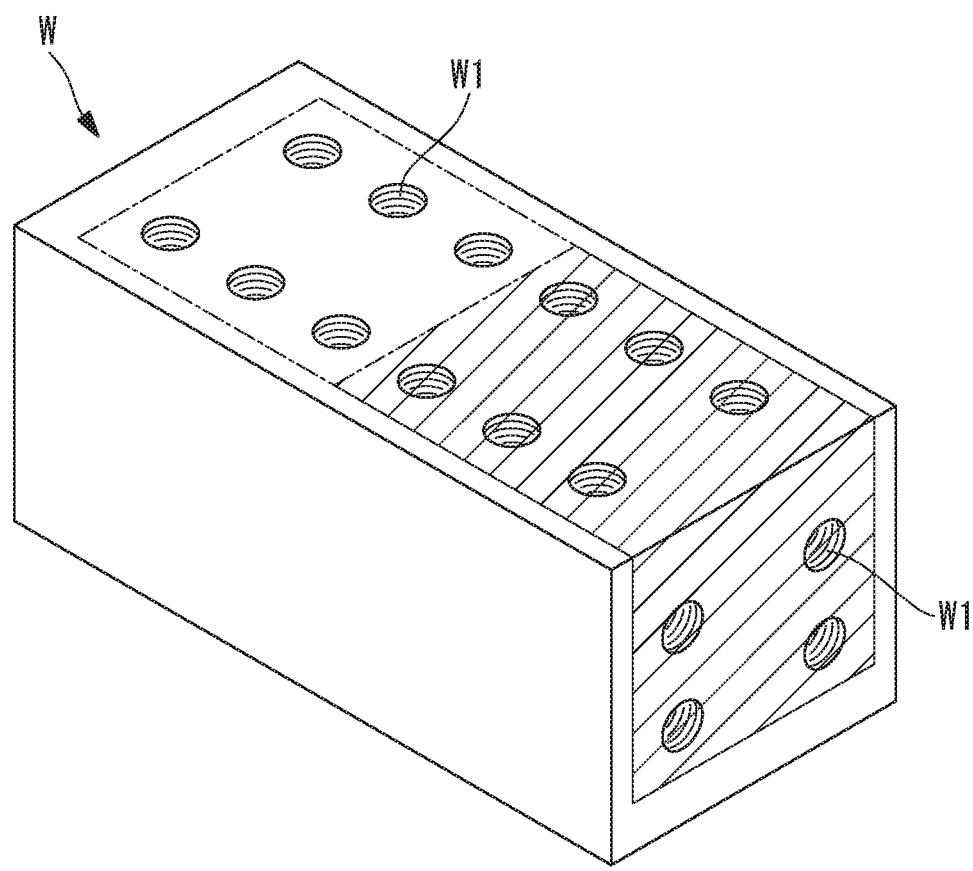
FIG. 2 is a perspective view showing a workpiece example and a display example of assigned locations in the collaborative robot system in FIG. 1.

As shown in FIG. 2, the screw holes W1 serving as work locations on the workpiece W are provided, for example, at a total of 16 locations, that is, four locations on a side surface of the workpiece W and 12 locations on a top surface of the workpiece W.

Figure 3:
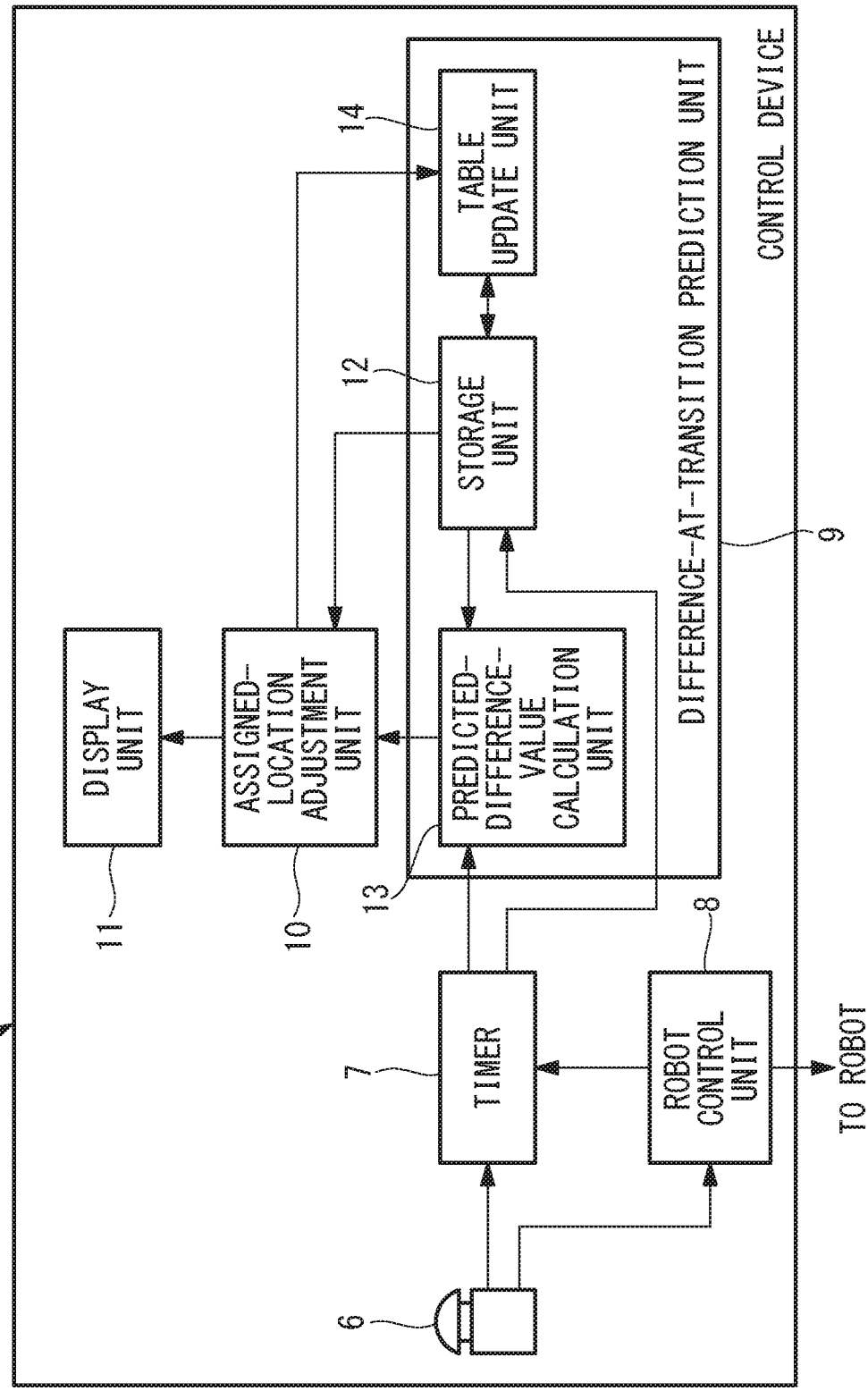
FIG. 3 is a block diagram showing a control device of the collaborative robot system in FIG. 1.

As shown in FIG. 3, the control device 4 includes: a press button 6 that is pressed by the worker P; a timer (work-time measurement unit) 7 that measures time; and a robot control unit 8 that controls the robot 3. The control device 4 also includes: a difference-at-transition prediction unit (difference-at-increase/decrease prediction unit) 9 that predicts the work-time difference between the worker P and the robot 3 when the number of locations assigned to the worker P is transitioned; an assigned-location adjustment unit 10 that adjusts the assigned locations on the basis of the predicted difference value; and a display unit (assigned-location indication unit) 11.

The press button 6 is pressed by the worker P when the workpiece W is conveyed into a work range, whereby a work start signal is generated. The press button 6 is pressed by the worker P when the worker P finishes fastening the bolts into all of the screw holes W1 at the locations assigned to the worker P, whereby a work end signal for the worker P is generated.

The timer 7 starts measurement of the work time of the worker P and the work time of the robot 3 in response to the work start signal generated as a result of the press button 6 being pressed. The timer 7 ends the measurement of the work time of the worker P in response to the work end signal generated as a result of the press button 6 being pressed. The timer 7 ends the measurement of the work time of the robot 3 in response to a signal that is generated from the robot control unit 8 and that indicates that the robot 3 has finished the tasks at the locations assigned to the robot 3.

The robot control unit 8 operates the robot 3 according to a program taught in advance, thereby causing the robot 3 to perform the tasks of fastening the bolts into the screw holes W1 at specified locations. The specified locations will be described later. In addition, when the robot 3 finishes the tasks of fastening the bolts into all of the screw holes W1 at the assigned locations, the robot control unit 8 transmits, to the timer 7, a signal indicating that the robot 3 has finished the tasks. The robot control unit 8, the difference-at-transition prediction unit 9, and the assigned-location adjustment unit 10 are each composed of a processor or a processor and a memory.

The difference-at-transition prediction unit 9 includes: a storage unit 12 that stores work-time increase/decrease tables; a predicted-difference-value calculation unit 13; and a table update unit 14.

The storage unit 12 stores two work-time increase/decrease tables for the worker P and the robot 3, respectively, with reference to the number of locations assigned to the worker P. The work time of the worker P and the work time of the robot 3 that have been measured by the timer 7 are also stored in the storage unit 12.

Figure 4:
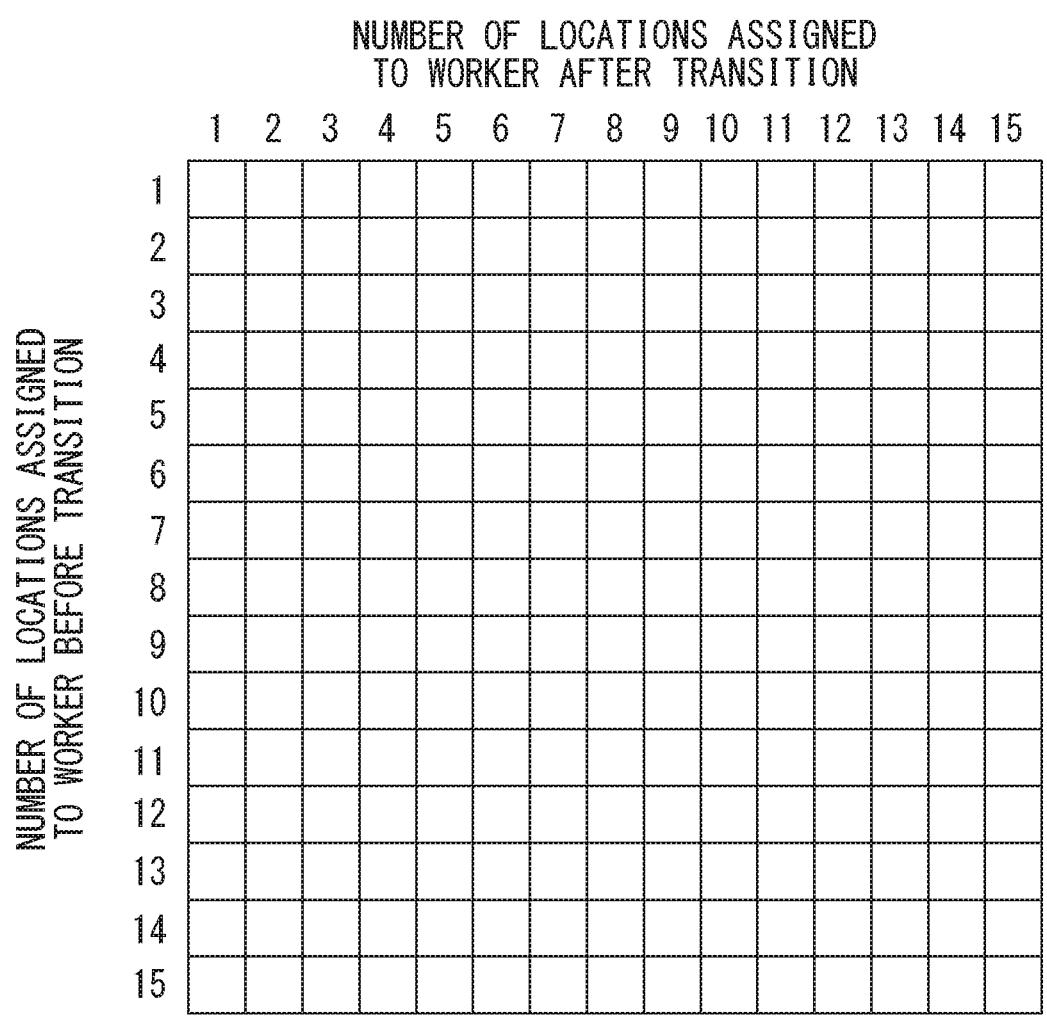
FIG. 4 is a diagram showing an example of a work-time increase/decrease table for a worker, which is stored in a storage unit of the control device in FIG. 3.

As shown in FIG. 4, the work-time increase/decrease table for the worker P indicates predicted increase/decrease values of the work time of the worker P when the number of locations assigned to the worker P is transitioned, with the vertical axis representing the number of locations assigned to the worker P before the transition and the horizontal axis representing the number of locations assigned to the worker P after the transition. Here, transition means increasing the number of assigned locations by one, decreasing said number by one, or maintaining said number.

Similar to FIG. 4, the work-time increase/decrease table for the robot 3 (not shown) also stores predicted increase/decrease values of the work time of the robot 3 when the number of locations assigned to the worker P is transitioned, with the vertical axis representing the number of locations assigned to the worker P before the transition and the horizontal axis representing the number of locations assigned to the worker P after the transition.

Here, refer to FIG. 5 showing an extracted part of FIG. 4.

According to FIG. 5, in the work-time increase/decrease table for the worker P, for example, in the case in which the number of locations assigned to the worker P before the transition is n and the number of locations assigned to the worker P after the transition is n−1, the predicted increase/decrease value of the work time of the worker P is Dp(n, n−1)=−2.5 seconds.

In the case in which the number of locations assigned to the worker P after the transition is n+1, the predicted increase/decrease value of the work time of the worker P is Dp(n, n+1)=+2.6 seconds. Even in the case in which the number of locations assigned to the worker P is maintained at n before and after the transition, the predicted increase/decrease value of the work time of the worker P is Dp(n, n)=+0.1 seconds due to fatigue or the like of the worker P.

In the work-time increase/decrease table for the robot 3, as shown in FIG. 6, for example, in the case in which the number of locations assigned to the worker P before the transition is n and the number of locations assigned to the worker P after the transition is n−1, the predicted increase/decrease value of the work time of the robot 3 is Dr(n, n−1)=+4.0 seconds. In the case in which the number of locations assigned to the worker P after the transition is n+1, the predicted increase/decrease value of the work time of the robot 3 is Dr(n, n+1)=−4.1 seconds. In the case in which the number of locations assigned to the worker P is maintained at n before and after the transition, the predicted increase/decrease value of the work time of the robot 3 is Dr(n, n)=0 seconds.

In the initial state, a suitable time is set for the work-time increase/decrease table, and the work locations assigned to the worker P are, for example, as indicated by hatching in FIG. 2, set to four locations on the side surface of the workpiece W and six locations on the top surface thereof. The work locations assigned to the robot 3 are set to six locations on the top surface, which are surrounded by a chain line in FIG. 2. Therefore, in this case, the number of locations assigned to the worker P is n=4+6=10.

The predicted-difference-value calculation unit 13 receives the work time of the worker P and the work time of the robot 3 that have been measured by the timer 7, and the predicted increase/decrease values of the work time that are stored in the work-time increase/decrease tables. Then, the predicted-difference-value calculation unit 13 calculates, by the following equations, the predicted difference value at increase in the case in which the number of locations assigned to the worker P is increased by one, and the predicted difference value at decrease in the case in which the number of locations assigned to the worker P is decreased by one, and outputs the smaller value as a first predicted difference value.

$$\alpha = |(Tr + Dr(n, n+1)) - (Tp + Dp(n, n+1))| + \gamma$$

$$\beta = |(Tr + Dr(n, n-1)) - (Tp + Dp(n, n-1))|$$

$$Td1 = \min(\alpha, \beta)$$

Here, $\alpha$ is the predicted difference value at increase, $\beta$ is the predicted difference value at decrease, Tr is the work time of the robot 3, Tp is the work time of the worker P, Td1 is the first predicted difference value, and $\gamma$ is the correction amount.

The correction amount $\gamma$ is a value set on the basis of the difficulty of the tasks and becomes larger as the work time becomes longer, the work-time variation becomes larger, the number of failures during work increases, or the number of retries increases. The correction amount $\gamma$ is, for example, set within the range of $0 < \gamma \leq 3$ seconds.

Regarding the work-time variation, either the work-time variation of the same worker P or the work-time variation between different workers P may be considered.

The predicted-difference-value calculation unit 13 calculates, by the following equation, a second predicted difference value Td2 on the basis of the work time Tr of the robot 3 and the work time Tp of the worker P that have been actually measured, and the predicted increase/decrease value Dp(n, n) of the work time of the worker P in the case in which the number of assigned locations is maintained.

$$Td2 = Tr - (Tp + Dp(n, n))$$

Then, the assigned-location adjustment unit 10 compares the first predicted difference value Td1 and an absolute value of the second predicted difference value Td2 that have been calculated by the predicted-difference-value calculation unit 13. As a result of the comparison, if the absolute value of the second predicted difference value Td2 is greater than the first predicted difference value Td1, the assigned-location adjustment unit 10 adjusts the number of assigned locations so that the difference between the work time of the robot 3 and the work time of the worker P becomes smaller, and determines new locations to be assigned. The assigned locations to be newly increased or decreased may be determined by a method according to a prescribed rule.

In the case in which the number of assigned locations is adjusted by the assigned-location adjustment unit 10, a display indicating the work locations assigned to the worker P is shown on the display unit 11. The display unit 11 is, for example, a monitor. As shown in FIG. 2, for example, the workpiece W is displayed on the display unit 11, and the work locations assigned to the worker P are displayed in a color-coded manner so as to be distinguished from the work locations assigned to the robot 3.

In any case where the number of locations assigned to the worker P is increased, decreased, or maintained by the assigned-location adjustment unit 10, the table update unit 14 updates the corresponding predicted increase/decrease value to an average value in a plurality of past cycles.

In the table update unit 14, the average value in the plurality of past cycles is, for example, calculated as follows. In other words, in the case in which the number of locations assigned to the worker P is transitioned from i to j in the present transition, the work time Tp(i) of the worker P that was measured in the previous cycle and the work time Tp(j) of the worker P that has been measured in the present cycle are used. By using the predicted increase/decrease value Dp(i, j) that is stored in the work-time increase/decrease table, the predicted increase/decrease value in the past transition from the same assigned-location number i to the assigned-location number j is approximately calculated by the following equation.

$$Dp(i,j)=((Tp(i)-Tp(j))+(k-1)Dp(i,j))/k$$

Similarly in the case of the robot 3, the work time Tr(i) of the robot 3 that was measured in the previous cycle and the work time Tr(j) of the robot 3 that has been measured in the present cycle are used. By using the predicted increase/decrease value Dr(i, j) that is stored in the work-time increase/decrease table, the predicted increase/decrease value in the past transition from the same assigned-location number i to the assigned-location number j is approximately calculated by the following equation.

$$Dr(i,j)=((Tr(i)-Tr(j))+(k-1)Dr(i,j))/k$$

However, in the case of the robot 3, the update is not performed when i=j.

Figure 7:
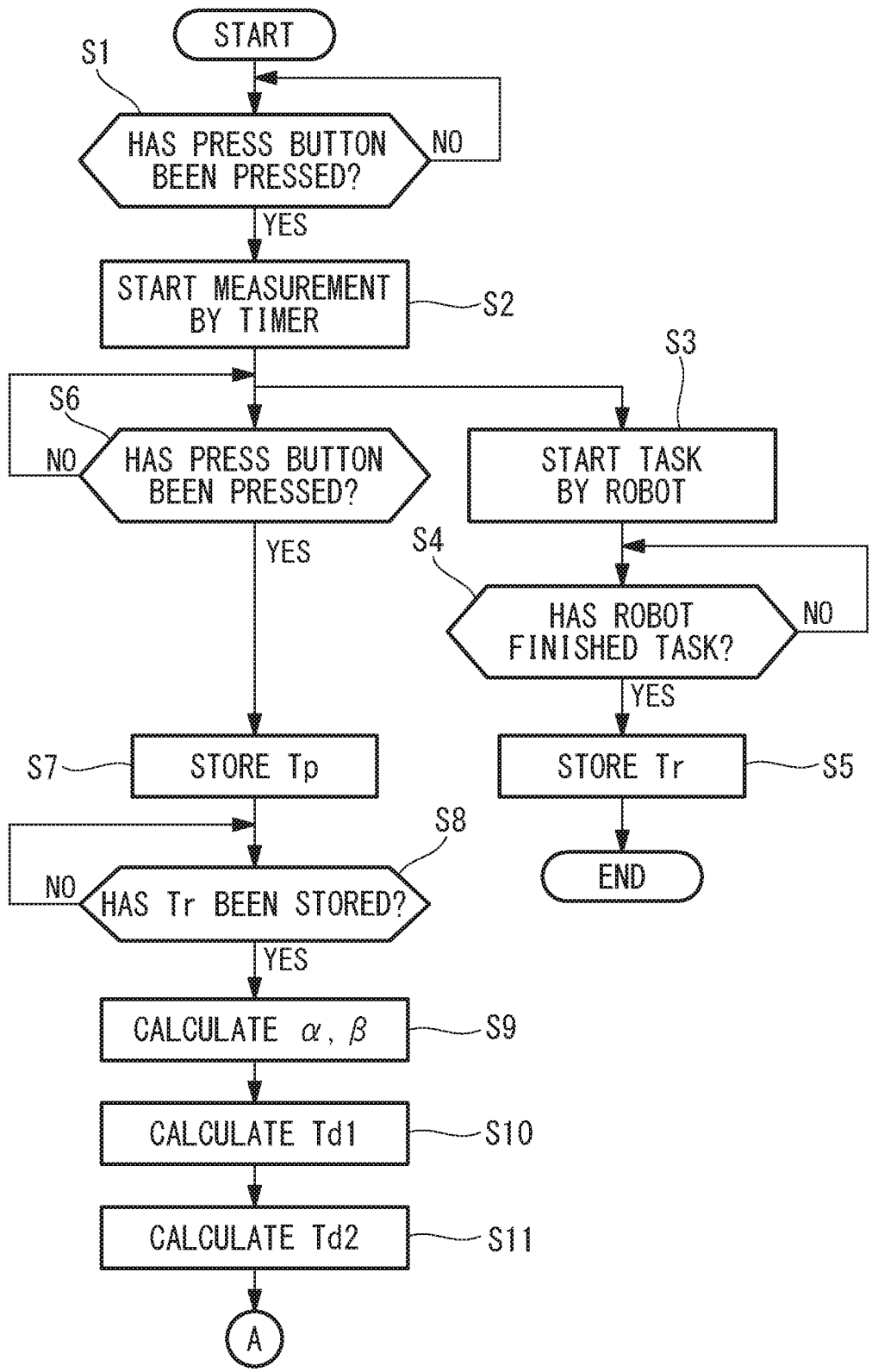
FIG. 7 is a flowchart for explaining the operation of the collaborative robot system in FIG. 1.

As described above, with the collaborative robot system 1 according to this embodiment, as shown in FIG. 7, when the worker P presses the press button 6 (step S1), the timer 7 starts measurement of the work time of the worker P and the work time of the robot 3 (step S2). When the press button 6 is pressed, the robot control unit 8 causes the robot 3 to start the tasks (step S3). Then, the robot control unit 8 successively determines whether or not the robot 3 has finished the tasks (step S4), and when the tasks are finished, said information is output to the timer 7, and the work time Tr of the robot 3 is stored in the storage unit 12 (step S5). When the work time Tr of the robot 3 is stored, the process is ended.

In parallel with the process from step S3 to step S5, when the worker P presses the press button 6 again at the time of finishing the tasks at all of the assigned locations (step S6), the work time Tp of the worker P is stored in the storage unit 12 (step S7). In a state in which the press button 6 is not pressed for the second time, the robot control unit 8 determines whether or not the work time Tr of the robot 3 has been stored in the storage unit 12 (step S8).

In the case in which the work time Tr of the robot 3 has been stored, the predicted-difference-value calculation unit 13 receives the work time of the worker P and the work time of the robot 3 that have been measured by the timer 7, and the predicted increase/decrease values of the work time that are stored in the work-time increase/decrease tables.

Then, the predicted-difference-value calculation unit 13 calculates the predicted difference value α at increase in the case in which the number of locations assigned to the worker P is increased by one, and the predicted difference value β at decrease in the case in which the number of locations assigned to the worker P is decreased by one (step S9), and calculates the smaller value as the first predicted difference value Td1 (step S10).

The predicted-difference-value calculation unit 13 receives the work time of the worker P and the work time of the robot 3 that have been measured by the timer 7, and the predicted increase/decrease values of the work time that are stored in the work-time increase/decrease tables. Then, the predicted-difference-value calculation unit 13 calculates the second predicted difference value Td2 for the work time of the worker P and the work time of the robot 3 in the case in which the number of locations assigned to the worker P is maintained (step S11).

Figure 8:
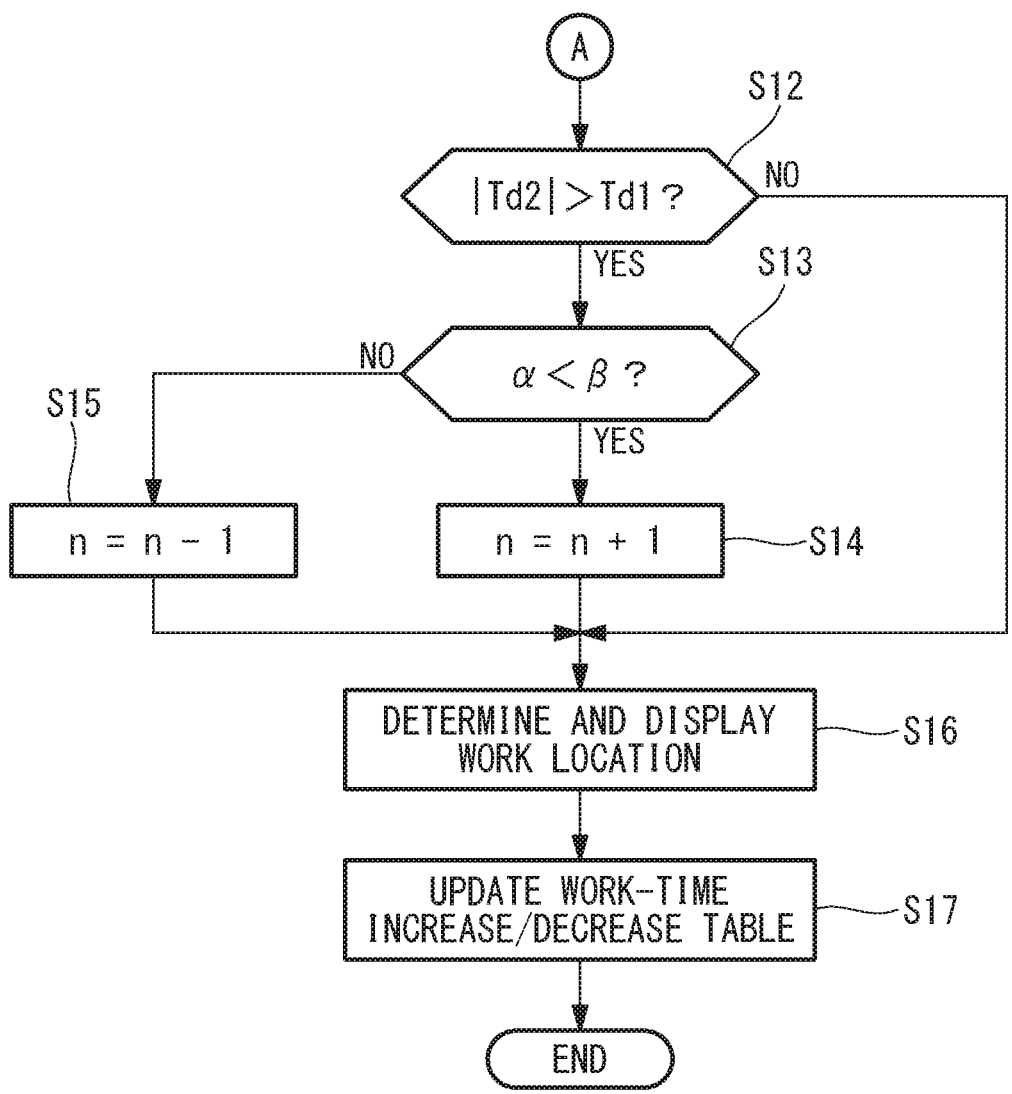
FIG. 8 is a flowchart following the flowchart in FIG. 7.

The first predicted difference value Td1 and the second predicted difference value Td2 that have been calculated by the predicted-difference-value calculation unit 13 are sent to the assigned-location adjustment unit 10. As shown in FIG. 8, the assigned-location adjustment unit 10 compares the first predicted difference value Td1 and the absolute value of the second predicted difference value Td2 (step S12), and adjusts the number of assigned locations if the first predicted difference value Td1 is smaller than the absolute value of the second predicted difference value Td2.

The adjustment of the number of assigned locations is performed in such a manner that the magnitude relationship between the predicted difference value α at increase and the predicted difference value β at decrease is confirmed (step S13), and if the predicted difference value α at increase is smaller than the predicted difference value β at decrease, the assigned-location number n for the worker P is increased by one (step S14). Meanwhile, if the predicted difference value α at increase is equal to or greater than the predicted difference value β at decrease, the assigned-location number n for the worker P is decreased by one (step S15).

If the first predicted difference value Td1 is equal to or greater than the absolute value of the second predicted difference value Td2 in step S12, the number of assigned locations is maintained without any change.

In the case in which the number of locations assigned to the worker P is increased or decreased, the assigned-location adjustment unit 10 determines which work location is to be increased or decreased, and outputs the result to the display unit 11 (step S16). The display unit 11 displays the locations assigned to the worker P, said locations being specified by the assigned-location adjustment unit 10, in a color-coded manner so as to be distinguished from the locations assigned to the robot 3.

The assigned-location adjustment unit 10 sends the transition of the number of assigned locations to the table update unit 14. The table update unit 14 calculates an approximate predicted increase/decrease value in the transition of the same number of assigned locations in a plurality of past cycles, and updates the work-time increase/decrease table stored in the storage unit 12 (step S17).

The worker P performs the tasks on the workpiece W according to the work locations assigned to the worker P, said locations being displayed on the display unit 11. By doing so, it is possible to minimize the difference between the work time of the worker P and the work time of the robot 3. As a result, the worker P and the robot 3 can finish the tasks at all of the assigned work locations substantially simultaneously, and thus, the work efficiency can be improved. In addition, there is an advantage in that it is possible to prevent the occurrence of variation in cycle time in the collaborative robot system 1 as a whole, not by changing the task assignment between the worker P and the robot 3 according to a prescribed time set in advance, but by reflecting momentarily changing work efficiency.

There is an advantage in that the predicted increase/decrease values of the work time of the worker P and the work time of the robot 3, when the number of locations assigned to the worker P is increased or decreased, are stored in the work-time increase/decrease tables, and it is possible to easily calculate the predicted difference value of the work time on the basis of the predicted increase/decrease values that are stored.

Because the work-time increase/decrease table stores the predicted increase/decrease value of the work time of the worker P when the number of locations assigned to the worker P is maintained, it is possible to prevent a decrease in work efficiency in the collaborative robot system 1 as a whole, even when the work efficiency changes due to the degree of fatigue or the like of the worker P.

Because the table update unit 14 updates the work-time increase/decrease tables on the basis of the work time of the worker P and the work time of the robot 3 that have been measured by the timer 7, there is an advantage in that it is possible to allocate the number of assigned tasks in accordance with differences among individual workers P and the types of tasks.

The table update unit 14 calculates the increase/decrease values of the work time on the basis of the work time measured in two consecutive cycles, and performs updating by using the average value of the plurality of calculated increase/decrease values as a new predicted increase/decrease value. By doing so, there is an advantage in that it is possible to achieve an update to a predicted increase/decrease value that is less susceptible to a sudden change in one cycle.

The difference-at-transition prediction unit 9 sets, as the first predicted difference value Td1, the smaller one of the predicted difference value at increase when the number of locations assigned to the worker P is increased and the predicted difference value at decrease when the number of locations assigned to the worker P is decreased. By doing so, it is possible to easily predict whether or not the number of tasks assigned to the worker P should be increased to minimize the difference between the work time of the worker P and the work time of the robot 3.

In the calculation of the predicted difference value at increase, the correction value γ is set on the basis of the difficulty of the tasks. By doing so, there is an advantage in that it is possible to calculate a predicted difference value based on the actual situation, considering that the work time of the worker P increases as the work time becomes longer, the work-time variation becomes larger, the number of failures during work increases, or the number of retries increases.

Although the collaborative robot system 1 in which the robot 3 and the worker P share the tasks of fastening the bolts into the screw holes W1 at the plurality of locations on the workpiece W conveyed by the conveyor 2 has been illustrated as an example in this embodiment, the invention is not limited thereto.

Although the vertical six-axis articulated robot has been illustrated as an example of the robot 3, the type and the structure, such as the number of axes, of the robot 3 are not limited thereto.

In this embodiment, the average value of the predicted increase/decrease values in the plurality of past cycles is employed as a new predicted increase/decrease value. Alternatively, it is permissible to compare the amount of change (difference value) in the work time of the worker P and the work time of the robot 3 in the previous cycle and the present cycle and the predicted increase/decrease value that is already stored in the work-time increase/decrease table, and to perform updating by using the greater value, i.e., the maximum value, as a new predicted increase/decrease value.

Although the monitor has been illustrated as an example of the display unit 11 in this embodiment, alternatively, the locations assigned to the worker P may be displayed on the actual workpiece W in a projected manner by means of projection mapping. Besides the case of displaying the workpiece W itself, as shown in FIG. 2, on the monitor serving as the display unit 11, it is permissible to display the assigned locations that are illustrated, or numerals, symbols or the like that indicate the assigned locations.

Although the work-time increase/decrease table indicating the relationship between the number of locations assigned to the worker P and the predicted increase/decrease value of the work time is stored in the storage unit 12 in this embodiment, the invention is not limited thereto. For example, the difference-at-transition prediction unit 9 may predict the difference between the work time of the worker P and the work time of the robot 3 by machine learning.

The learning parameters used in the machine learning may include:
1. performance (work time, the number of failures during work, and the number of retries);
2. biological information (degree of pupil dilation, body temperature, etc.);
3. environmental information (room temperature, humidity, continuous work time, etc.); and
4. attribute information (age, sex, years of work experience, residence, commuting time, etc.).

By detecting or inputting one or more of these learning parameters, it is possible to precisely predict the number of assigned tasks for minimizing the difference between the work time of the worker P and the work time of the robot 3.

In this case, a plurality of work stations where the worker P and the robot 3 individually share the tasks, a network that connects the individual work stations, and a management unit connected to the network may be provided. In this case, the difference-at-transition prediction unit 9 may be provided in the management unit, and the difference-at-transition prediction unit 9 may perform the machine learning on the basis of information collected from the individual work stations via the network.

The invention claimed is:
1. A collaborative robot system, comprising:
a robot adapted to share tasks with a worker, wherein the worker is assigned a first plurality of tasks at first locations on a workpiece and the robot is assigned a second plurality of tasks at second locations on the workpiece, the first plurality of tasks and the second plurality of tasks being performed in parallel on the workpiece;
a display; and
a controller connected to the robot and to the display, wherein the controller assigns the first plurality of tasks to the worker and the second plurality of tasks to the robot, wherein the controller controls the robot according to instructions stored in a memory, and wherein the controller, during each cycle of a plurality of cycles,
a first total work time for the worker to complete the first plurality of tasks,
measures a second total work time for the robot to complete the second plurality of tasks, predicts a first difference between the first total work time and the second total work time when a number of the first locations is increased or decreased by comparison with a preceding cycle, predicts a second difference between the first total work time and the second total work time when the number of the first locations is maintained by comparison with the preceding cycle, increases or decreases the number of the first locations so that the first difference is made to be smaller than the second difference; and via the display, displays to the worker, the first locations after the number of the first locations is increased or decreased.

2. The collaborative robot system according to claim 1, wherein:

the memory includes work-time increase/decrease tables that include predicted increase/decrease values of the first difference; and the controller calculates the first difference using the predicted increase/decrease values stored in the memory.

3. The collaborative robot system according to claim 2, wherein the work-time increase/decrease tables also store the predicted increase/decrease values of second difference.

4. The collaborative robot system according to claim 2, wherein the controller also updates the work-time increase/decrease tables using the first total work time and the second total work time.

5. The collaborative robot system according to claim 4, wherein the controller calculates the predicted increase/decrease values of the work time based on the first total work time and the second total work time measured in two consecutive cycles and updates the work-time increase/decrease tables using an average value thereof as a new predicted increase/decrease value.

6. The collaborative robot system according to claim 4, wherein the controller calculates the predicted increase/decrease values of the work time based on the first total work time and the second total work time measured in two consecutive cycles and updates the work-time increase/decrease tables using a maximum value thereof as a new predicted increase/decrease value.

7. The collaborative robot system according to claim 1, wherein the controller sets, as a first predicted difference, the smaller of the first predicted difference when the number of first locations is increased and the first predicted difference when the number of first locations is decreased.

8. The collaborative robot system according to claim 7, wherein the controller corrects the first predicted difference by taking into account a task difficulty when the number of first locations is increased.

9. The collaborative robot system according to claim 1, further comprising:

a plurality of work stations where the robot and the worker share tasks;

a network that connects the individual work stations; and a management unit that is connected to the network, wherein the controller is provided in the management unit, and wherein the controller operates using information collected from the individual work stations via the network.

10. A collaborative robot system, comprising:

a robot adapted to share tasks with a worker, wherein the worker is assigned first tasks to perform at first locations and the robot is assigned second tasks to perform at second locations, the first tasks and the second tasks being performed in parallel on the workpiece;

a timer that measures, in each cycle, a first total work time for the worker to complete the first tasks at the first locations and a second total work time for the robot to complete the second tasks at the second locations;

one or more processors; and a display, wherein the one or more processors are configured to:

predict a difference between the first total work time and the second total work time, when the number of first locations is increased or decreased, increase or decrease the number of the first locations and the second locations to minimize the difference between the first total work time and the second total work time, and indicate, on the display, the first locations after the number of first locations is increased or decreased.

* * * * *